United States Patent Office 2,863,898
Patented Dec. 9, 1958

2,863,898

PENTACHLOROBENZENETHIOLMETHYL SUBSTITUTED ORGANOSILOXANES

Robert L. Merker, Pittsburgh, Pa., assignor to Dow Corning Corporation, Midland, Mich., a corporation of Michigan No Drawing. Application July 5, 1957
Serial No. 669,939

7 Claims. (Cl. 260—448.2)

The present invention relates to pentachlorobenzenethiolmethyl substituted organosiloxanes, i. e. siloxanes containing the grouping

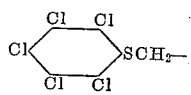

attached to at least some of the silicon atoms therein.

Organosiloxane liquids and their desirable properties of inertness, low viscosity-temperature slope, thermal stability, etc. are well known. Their lubricating qualities, however, are in general relatively poor as compared to organic lubricants. It is a major object of this invention to provide novel organosiloxanes of greatly improved ability to lubricate metal surfaces, or which can be added to conventional organosiloxanes to improve the lubricating qualities of the latter. Other objects and advantages will be apparent from the following specification.

This invention is particularly concerned with a pentachlorobenzenethiolmethyl substituted organosiloxane in which at least 0.1 molar percent of the siloxane units present are of the formula $$(Cl_5C_6SCH_2)R_xSiO_{\frac{3-x}{2}}$$

where $x$ is an integer of from 1 to 2 inclusive and R is a radical selected from the group consisting of alkyl and aryl radicals, any other siloxane units present being of the formula $$R'_ySiO_{\frac{4-y}{2}}$$

where $y$ is an integer of from 1 to 3 inclusive and R' is a radical selected from the group consisting of alkyl, aryl, haloalkyl, and haloaryl radicals, said organosiloxane having an average of from 1.9 to 3 inclusive total organic groups attached to silicon per silicon atom.

From the above definition it can be seen that from 0.1 to 100 percent of the Si atoms present in the organosiloxane contain one $Cl_5C_6SCH_2$— group attached thereto. Each Si atom so substituted must also have either 1 or 2 alkyl and/or aryl radicals attached thereto by C-Si linkage. If any other organosiloxane units are present in the polymer, each such unit can contain 1, 2 or 3 organic radicals attached to the Si atom therein by C-Si linkage, and said radicals can be alkyl, aryl, haloalkyl, or haloaryl radicals alone or in any combination. When such other units are present, however, they must be of a type and present in an amount such that the average degree of substitution ranges from 1.9 to 3 inclusive. In other words, the average ratio of total organic groups per silicon atom (i. e. R groups plus R' groups plus $Cl_5C_6SCH_2$— groups divided by total Si atoms) must be from 1.9 to 3.

The organosiloxanes of this invention can be prepared by reacting the sodium salt of pentachlorobenzenethiol with an organosiloxane which contains a $ClCH_2$— group attached to those silicon atoms which one wishes to substitute with the $Cl_5C_6SCH_2$— group. Thus the reaction in simplified form can be represented as follows:

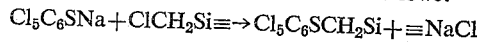

In the above equation, the open valences of Si which are not satisfied by 1 or 2 R groups are satisfied by oxygen atoms which in turn are attached to other silicon atoms.

Even the most complex copolymers of this invention can be prepared by the single reaction described above by choosing the corresponding $ClCH_2$— substituted organosiloxane as a reactant, and a wide variety of such siloxanes are known to the art. It is preferable, however, to prepare such complex copolymers by reacting the sodium salt with a relatively simple $ClCH_2$— substituted organosiloxane, followed by "equilibrating" or copolymerizing the resulting product with a conventional organosiloxane which contains the other organic groups desired in the final product. The usual well known siloxane polymerization catalysts and techniques can be used in the latter steps.

Thus, for example, the thiol salt can be reacted with a disiloxane of the formula $(ClCH_2R_2Si)_2O$ to produce the corresponding derivative of the formula $(ZR_2Si)_2O$, where Z represents the $Cl_5C_6SCH_2$— group. The latter derivative can then be equilibrated with any organosiloxane containing $R'SiO_{1.5}$, $R'_2SiO$, or $R'_3SiO_{.5}$ units in any combination suitable to provide the required minimum degree of substitution of 1.9. Likewise the thiol salt can be reacted with, e. g., a linear organosiloxane containing repeating units of the formula $ClCH_2RSiO$, or a cyclic compound such as $(ClCH_2RSiO)_4$ or

to produce the corresponding derivatives containing ZRSiO units alone or together with $R_2SiO$ units. These derivatives can then be equilibrated with the conventional organosiloxanes as previously discussed.

The R and R' radicals are inert throughout the salt reaction and equilibration, hence those radicals which are originally present in the reactants will be found in the product. As noted previously, the R radicals are alkyl and/or aryl radicals. Examples of the former include such illustrative species as methyl, ethyl, propyl, octadecyl, cyclohexyl, and benzyl. Suitable aryl radicals include phenyl, tolyl, xenyl, and naphthyl. The chloromethyl substituted siloxanes can be prepared, e. g., by hydrolyzing or cohydrolyzing $ClCH_2RSiCl_2$ or $ClCH_2R_2SiCl$ compounds, or by cohydrolyzing either or both of such compounds with one or more $R'_ySiCl_{4-y}$ type compounds, $y$ being 1, 2, or 3. The chloromethylchlorosilanes used in the above hydrolyses are known compounds, and can be prepared, e. g., by chlorinating the corresponding $CH_3R_xSiCl_{3-x}$ compounds or by chlorinating $CH_3SiCl_3$ to form $ClCH_2SiCl_3$ followed by the reaction of the latter with the appropriate Grignard reagent to introduce any desired R groups. For ease of preparation, availability, and superior properties, it is preferred that R be methyl and/or phenyl.

The conventional organosiloxane polymers used herein for equilibration are of course well known, and many are commercially available. These polymers have the average general formula $$R'_ySiO_{\frac{4-y}{2}}$$

where $y$ has a value from 1 to 3 inclusive. The R' radicals can be alkyl or aryl (suitable species being the same as the illustrative R radicals given above); or haloalkyl such as chloromethyl and 1,1,1-trifluoropropyl; or haloaryl such as chlorophenyl, bromophenyl, dichlorophenyl, tetrachloroxenyl, and α,α,α-trifluorotolyl. These "conventional" organosiloxane polymers should either be liquid or capable of being dissolved in inert organic solvents such as benzene, toluene, or xylene, so that they can be intimately mixed with the $Cl_5C_6SCH_2$-substituted polymers for equilibration purposes. They also can contain uncondensed silicon-bonded OH groups, as is particularly common among those polymers having an average degree of substitution of less than 2.

When equilibration techniques are used herein, the reactants are intimately mixed (using an organic solvent if necessary) in the presence of a siloxane polymerization catalyst. Concentrated sulfuric acid and trifluoroacetic acid are preferred examples of suitable catalysts, and they can be used, e. g., in amounts of from 0.5 to 5% by weight based on the weight of the siloxanes present. The equilibration often proceeds at room temperature, but can be expedited at elevated temperatures, e. g. 50° to 175° C.

It is to be understood that the term "polymer" is used herein as inclusive of dimers and copolymers. Thus the invention includes dimers such as $(ZMe_2Si)_2O$, $(ZMePhSi)_2O$, $ZPh_2SiOSiMe_2Z$, $ZMe_2SiOSiMe_3$ $ZMePhSiOSiMe_2Ph$, and $(ZMeEtSi)_2)O$ (For simplicity, the symbols Z, Me, Et, and Ph are used above, and hereafter in this specification, as $Cl_5C_6SCH_2-$, methyl, ethyl, and phenyl radicals respectively.) The invention also includes true polymers in the narrower sense, such as siloxanes of the formulas $(ZMeSiO)_d$, $(ZEtSiO)_d$, and $(ZPhSiO)_d$. These may be in the form of cyclic compounds, e. g. where $d$ is 3, 4, or 5, or in the form of linear polymers end-blocked with silicon-bonded OH groups where $d$ is any integer and may range up to an average value of 1000 or more.

Another type of compound within the scope of the invention is that in which the Z group occurs in the end-blocking unit of a linear polymer of $R'_2SiO$ units. This type includes low molecular weight compounds such as $ZMe_2SiO(Me_2SiO)SiMe_3$, $ZMe_2SiO(Me_2SiO)SiMe_2Z$, $ZMePhSiO(Me_2SiO)SiMePhZ$, and $ZPh_2SiO(PhMeSiO)SiMe_2Z$ This type also includes the high polymers such as those of the general formulas $ZMe_2SiO(Me_2SiO)_dSiMe_2Z$, $ZMePhSiO(Me_2SiO)_dSiMe_2Z$, $ZMe_2SiO(Me_2SiO)_d(MePhSiO)_eSiMe_2Z$, and $ZMe_2SiO(Me_2SiO)_d(Cl_2C_6H_3MeSiO)_eSiMe_2Z$ In these polymers, $d$ and $e$ can be any integer so long as the required 0.1 molar percent of Z-containing units is present, i. e. the average sum of $d$ plus $e$ is not more than 2000. Where more than one type of $R'_2SiO$ unit occurs in the above formulas, each will of course appear throughout the molecule in a random pattern of distribution and not in the grouped pattern which is shown above for convenience.

All of the above polymers containing the Z group in the end-blocking unit can be defined as linear polymers of one or more $R'_2SiO$ units end-blocked with $ZR_2SiO_{.5}$ units. For lubricant purposes, the most practical range of viscosities is obtained when the latter units are present in an amount of from 1 to 10 inclusive molar percent. The best viscosity-temperature slope characteristics are obtained when all R and R' radicals are methyl, but thermal stability is improved when at least some of the R and/or R' radicals are phenyl. Thus one preferred type of copolymer is one in which the units consist essentially of from 0.1 to 10 inclusive molar percent of units of the formula $(Cl_5C_6SCH_2)Me_2SiO_{.5}$, from 1 to 99.9 inclusive molar percent of units of the formula $PhMeSiO$, and from 0 to 98 inclusive molar percent of units of the formula $Me_2SiO$. Preferably there is at least 10 molar percent of the latter units present, in which case there will be a maximum of 89.9 mol percent of the PhMeSiO units.

The lubricating qualities of the products of this invention can be further improved in regard to some metal surfaces by incorporating siloxane units which have haloaryl radicals directly attached to the Si atom. The chlorine or bromine substituted phenyl or xenyl radicals described in Fletcher and Hunter Patent No. 2,599,984, issued June 10, 1952, are particularly effective and are preferred. The best form of the modification in question is that in which the copolymer contains (A) from 0.1 to 10 inclusive mol percent of $ZMe_2SiO_{.5}$ units, (B) from 70 to 99.8 inclusive mol percent of $Me_2SiO$ units, (C) from 0 to 20 inclusive mol percent of $(Cl_aC_6H_{5-a})MeSiO$ units where $a$ is 1 or 2, and (D) from 0 to 10 mol percent of $(Cl_bC_6H_{5-b})SiO_{1.5}$ units where $b$ is 1 or 2, there being from 0.1 to 20 inclusive mol percent of (C) plus (D) units. In other words, there can be present up to 20 mol percent of the "di-substituted" $(ClC_6H_4)MeSiO$ units and/or $(Cl_2C_6H_3)MeSiO$ units, or alternatively up to 10 mol percent of the "mono-substituted" $(ClC_6H_4)SiO_{1.5}$ and $(Cl_2C_6H_3)SiO_{1.5}$ units, or any combination of any of the four units so long as the polymer contains at least 0.1 mol percent of at least one of the units and not more than the defined maximum of (C) or (D) or (C) plus (D) units.

A still further type of polymer within the scope of the invention is one in which $ZRSiO$ units, either with or without additional $R'_2SiO$ units, form the repeating units in a linear chain which is end-blocked with $R'_3SiO_{.5}$ units. The preferred form of this type of polymer is one which contains from 0.1 to 99 inclusive mol percent of $ZMeSiO$ units, from 1 to 66⅔ inclusive mol percent $Me_3SiO_{.5}$ units, and from 0 to 98.9 inclusive mol percent $Me_2SiO$ units. For the best temperature-viscosity slope characteristics, it is preferred that there be at least 70 mol percent of the latter units, in which case there would of course be a maximum of 29.9 mol percent of the $Me_3SiO_{.5}$ units. The thermal stability of this type of polymer can be increased by incorporating $PhMeSiO$ and/or $Ph_2SiO$ units in amounts up to, e. g., 50% of the total $R'_2SiO$ units present. It is also possible to modify the lubricity characteristics of this type of polymer by incorporating haloaryl substituted siloxane units, e. g. $ClC_6H_4MeSiO$ and/or $Cl_2C_6H_3MeSiO$ units in amounts up to 20 mol percent, or $ClC_6H_4SiO_{1.5}$ and/or $Cl_2C_6H_3SiO_{1.5}$ units in amounts up to 10 mol percent of the total siloxane units present. As with the similarly modified polymers discussed previously, within the defined limits any combination of any of these four units can be present but it is preferred that the total not exceed 20 mol percent.

The products of this invention vary from relatively low viscosity liquids to non-flowing gums, and include crystalline materials as well. The liquid materials are useful as oily lubricants per se and as bases to which conventional grease forming or thickening agents can be added. Examples of such agents include silica, alkali metal and alkaline earth salts of fatty acids such as lithium stearate, hydroxystearic acid salts, carbon black, alkali metal and alkaline earth metal salts of alicyclic substituted fatty acids having a chain length of 1 to 6 carbon atoms, etc. as has been extensively documented in the organosiloxane patent literature (see, e. g., the aforesaid U. S. Patent No. 2,599,984). Gums prepared in accordance with this invention can be mixed with suitable fillers (e. g. fume silica, silica aerogel, diatomaceous earth, titania, ferric oxide, and the like) and "cured" or "vulcanized" by the usual techniques to form silicone rubbers having modified properties, e. g. solvent-swelling characteristics. The utility of the crystalline products lies largely in their use as reactants in equilibration processes to form other silicone products.

It is to be understood that the polymers of the present invention can contain small amounts (usually less than 0.3 percent by weight) of uncondensed silicon-bonded hydroxy groups or unhydrolyzed silicon-bonded hydrolyzable groups (e. g. Cl or alkoxy groups) carried over from the intermediate monomers from which the polymers have been prepared. The presence of such groups is, of course, not at all uncommon in conventional organosiloxanes.

The following examples are illustrative only. All parts are parts by weight unless otherwise indicated.

*Example 1*

Pentachlorobenzenethiol was "neutralized" to a pH of 10 by the addition of a solution of NaOH in isopropyl alcohol. The resulting salt slurry was devolatilized and dried at 80° C., and 2 moles of the salt was reacted with 1 mole of $(ClCH_2Me_2Si)_2O$ in 5 times the latter's weight of dimethylformamide by heating the mixture at reflux temperature. A quantitative amount of NaCl was removed from the reaction product by filtration, then the filtrate was diluted with benzene and washed with water. The dimeric product $[(Cl_5C_6SCH_2)Me_2Si]_2O$ was precipitated from the benzene in 85% yield. Recrystallization from acetone gave a product with a melting point of 111.5° C.

*Example 2*

A mixture was prepared containing 16.4 parts of the product of Example 1, 44 parts benzene, 67.25 parts of the cyclic $(Me_2SiO)_4$, and 2 parts concentrated sulfuric acid. The starting siloxanes provided a ratio of two $(Cl_5C_6SCH_2)Me_2SiO_{.5}$ groups per 40 $Me_2SiO$ groups. This mixture was warmed at 50° C. for a total of 40 hours, complete solution of the dimer being obtained during the first 20 hours. The resulting equilibration product was further diluted with benzene and washed with a dilute aqueous solution of sodium bicarbonate until free of acid, then further washed with water alone. The benzene was removed by distillation and the resulting fluid product was further devolatilized at 100° C. under reduced pressure. The final fluid product had a viscosity of 90.45 cs. at 25° C., $n_D^{25}$ 1.4340, $d_4^{25}$ 1.059. Analysis showed 31.53% by weight Si in the product, as compared to the 31.93% Si calculated for a polymer having the average formula $(Cl_5C_6SCH_2)Me_2SiO(Me_2SiO)_{40}SiMe_2(CH_2SC_6Sl_5)$ The lubricating properties of the fluid product were tested in the well known "Shell four-ball wear test." After 2 hours at 1200 R. P. M. under a 40 kg. load and at a test temperature of 275° F., an average "scar diameter" of only 0.92 mm. was obtained. In comparison, a fluid containing $Cl_2C_6H_3MeSiO$ units in an amount of 10 mol percent, the remaining units being $Me_2SiO$ and $Me_3SiO_{.5}$ units, gave a scar diameter of 2.0 mm. in the same test. A fluid of comparable viscosity containing only $Me_2SiO$ and $Me_3SiO_{.5}$ units is relatively so poor a lubricant for steel-on-steel that seizure occurs and a comparable test cannot even be run.

*Example 3*

Using the equilibration technique of Example 2, $[(Cl_5C_6SCH_2)Me_2Si]_2O$ was reacted with various other siloxanes to form the corresponding copolymers. Thus when 1 mole of the dimer is reacted with 10 moles $(PhMeSiO)_4$ the resulting copolymer has the average formula $ZMe_2SiO(PhMeSiO)_{40}SiMe_2Z$ where Z is the $Cl_5C_6SCH_2-$ radical. When the dimer is reacted with $(Me_2SiO)_4$ in the molar ratio of 1:500, a copolymer with the average formula $ZMe_2SiO(Me_2SiO)_{2000}SiMe_2Z$ is obtained as a very viscous liquid. When 1 mole of the dimer is reacted with 5 moles $(Me_2SiO)_4$ and 5 moles $(PhMeSiO)_4$ the liquid copolymeric product has the average formula $ZMe_2SiO(Me_2SiO)_{20}(PhMeSiO)_{20}SiMe_2Z$.

*Example 4*

A mixture of 1 mole $Cl_2C_6H_3SiCl_3$, 1 mole $Cl_2C_6H_3MeSiCl_2$ and 7 moles $Me_2SiCl_2$ was mixed with an equal weight of toluene and cohydrolyzed by adding it to an excess of cold water. The toluene solution of cohydrolyzate was heated to reflux temperature, and then was washed free of acid. When this cohydrolyzate is mixed with 0.5 mole of the dimer product of Example 1 and equilibrated by the method of Example 2, a copolymeric liquid is obtained containing 10 mol percent $Cl_2C_6H_3SiO_{1.5}$ units, 10 mol percent $Cl_2C_6H_3MeSiO$ units, 70 mol percent $Me_2SiO$ units, and 10 mol percent $(Cl_5C_6SCH_2)Me_2SiO_{.5}$ units.

*Example 5*

When 1 mole of $ClCH_2Me_2SiOSiMe_3$ is reacted with 1 mole of the sodium salt of pentachlorobenzenethiol by the method of Example 1, the product $(Cl_5C_6SCH_2)Me_2SiOSiMe_3$ is obtained. When the latter is equilibrated with $(Me_2SiO)_4$ by the method of Example 2, a mixture of copolymers is obtained, some being of the type $Me_3SiO(Me_2SiO)_dSiMe_3$ some of the type $ZMe_2SiO(Me_2SiO)_dSiMe_2Z$, and some of the type $ZMe_2SiO(Me_2SiO)_dSiMe_3$ where Z is $Cl_5C_6SCH_2-$ and $d$ represents the degree of polymerization.

*Example 6*

When 1 mole of $(ClCH_2MePhSi)_2O$ is reacted with 2 moles of the salt of Example 1, the resulting product has the formula $(ZMePhSi)_2O$ where Z is $Cl_5C_6SCH_2-$. When the latter product is equilibrated with $(Me_2SiO)_4$ as in Example 2, the copolymeric product is a liquid having the average formula $ZMePhSiO(Me_2SiO)_{40}SiMePhZ$

*Example 7*

When 1 mole of the salt of Example 1 is reacted as in that example with 1 mole of the compound $Me_3SiO(ClCH_2MeSiO)SiMe_3$ the resulting product has the formula $Me_3SiO(ZMeSiO)SiMe_3$ where Z is the $Cl_5C_6SCH_2-$ radical.

*Example 8*

When 1 mole of the salt of Example 1 is reacted with 1 mole of chloromethylheptamethylcyclotetrasiloxane, i. e.

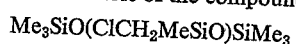

the corresponding cyclic compound

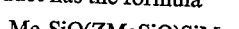

is obtained, where Z is the $Cl_5C_6SCH_2-$ radical. When hexamethyldisiloxane is equilibrated with the latter in the molar ratio of 1:2 by the method of Example 2, a liquid having the average formula $Me_3SiO(ZMeSiO)_2(Me_2SiO)_6SiMe_3$ is obtained. If the compound $Me_3SiO(ClCH_2MeSiO)SiMe_3$ is used in place of the hexamethyldisiloxane in the above equilibration, the resulting product has the average formula $$Me_3SiO(ClCH_2MeSiO)(ZMeSiO)_2(Me_2SiO)_6SiMe_3$$

*Example 9*

When equimolar portions of the salt of Example 1 and of a toluene solution of the hydrolyzate of $ClCH_2MeSiCl_2$ are reacted, the resulting product contains cyclics of the type $(ZMeSiO)_d$ and hydroxy end-blocked linear polymers containing repeating ZMeSiO units, where Z is the $Cl_5C_6SCH_2-$ radical. Equilibration of this product with $Me_2PhSiOSiPhMe_2$ by the method of Example 2 produces copolymers of the type $$Me_2PhSiO(ZMeSiO)_dSiMe_2Ph$$

Equilibration with an excess of hexamethyldisiloxane produces the linear trimer $Me_3SiO(ZMeSiO)SiMe_3$.

That which is claimed is:

1. A pentachlorobenzenethiolmethyl substituted organosiloxane in which at least 0.1 molar percent of the siloxane units present are of the formula $$(Cl_5C_6SCH_2)R_xSiO_{\frac{3-x}{2}}$$

where $x$ is an integer of from 1 to 2 inclusive and R is a radical selected from the group consisting of alkyl and aryl radicals, any other siloxane units present in the organosiloxane being of the formula $$R'_ySiO_{\frac{4-y}{2}}$$

where $y$ is an integer of from 1 to 3 inclusive and R' is a radical selected from the group consisting of alkyl, aryl, haloalkyl, and haloaryl radicals, said organosiloxane having an average of from 1.9 to 3 inclusive total organic groups attached to silicon per silicon atom.

2. An organodisiloxane having the formula $$[(Cl_5C_6SCH_2)(CH_3)_2Si]_2O$$

3. An organosiloxane linear polymer in which the repeating units are of the formula $(CH_3)_2SiO$ and the end-blocking units are of the formula $$(Cl_5C_6SCH_2)(CH_3)_2SiO_{.5}$$

the latter being present to the extent of at least 0.1 molar percent of the total siloxane units.

4. A linear polymer in accordance with claim 3 wherein the $(Cl_5C_6SCH_2)(CH_3)_2SiO_{.5}$ units represent from 1 to 10 inclusive molar percent of the total siloxane units.

5. An organosiloxane in which the polymeric units consist essentially of from 0.1 to 10 inclusive molar percent of units of the formula $(Cl_5C_6SCH_2)(CH_3)_2SiO_{.5}$, from 1 to 99.9 inclusive molar percent of units of the formula $(C_6H_5)(CH_3)SiO$, and up to 98 inclusive molar percent of units of the formula $(CH_3)_2SiO$.

6. An organopolysiloxane in which the polymeric units consist essentially of (A) from 0.1 to 10 inclusive molar percent of units of the formula $(Cl_5C_6SCH_2)(CH_3)_2SiO_{.5}$, (B) from 70 to 99.8 inclusive molar percent of units of the formula $(CH_3)_2SiO$, (C) up to 20 inclusive molar percent of units of the formula $(Cl_aC_6H_{5-a})CH_3SiO$ where $a$ is 1 to 2 inclusive, and (D) up to 10 inclusive molar percent of units of the formula $(Cl_bC_6H_{5-b})SiO_{1.5}$ where $b$ is 1 to 2 inclusive, the total of (C) and (D) units present being from 0.1 to 20 inclusive molar percent of the total siloxane units present and there being at least as many (A) units as (D) units in the polymer.

7. An organopolysiloxane in which the polymeric units consist essentially of from 0.1 to 99 inclusive molar percent of units of the formula $(Cl_5C_6SCH_2)CH_3SiO$, from 1 to 66⅔ inclusive molar percent of units of the formula $(CH_3)_3SiO_{.5}$, and up to 98.9 inclusive molar percent of units of the formula $(CH_3)_2SiO$.

References Cited in the file of this patent

UNITED STATES PATENTS

| | | |
|---|---|---|
| 2,544,296 | Burkhard | Mar. 6, 1951 |
| 2,604,486 | Burkhard | July 22, 1952 |
| 2,719,165 | Cooper | Sept. 27, 1955 |
| 2,802,853 | George | Aug. 13, 1957 |

OTHER REFERENCES

V. O. Lukashevich et al.: Chem. Abst., vol 45, page 1566g (1951).

Gilman et al.: J. A. C. S., vol. 75, pages 3760–3762 (1953).

UNITED STATES PATENT OFFICE
Certificate of Correction

Patent No. 2,863,898                                        December 9, 1958

Robert L. Merker

It is hereby certified that error appears in the printed specification of the above numbered patent requiring correction and that the said Letters Patent should read as corrected below.

Column 2, line 3, the right-hand portion of the equation should read as shown below instead of as in the patent—

$$Cl_5C_6SCH_2Si\equiv +NaCl$$

column 3, line 23, for "(ZMeEtSi)$_2$)O" read —(ZMeEtSi)$_2$O—; line 44, for "high" read —higher—; column 4, line 22, for "and (Cl$_2$C$_6$H$_3$)SiO$_{1.5}$" read —and/or $$(Cl_2C_6H_3)SiO_{1.5}—;$$

column 5, line 45, right-hand portion of the formula, for "(CH$_2$SC$_6$Sl$_5$)" read —(CH$_2$SC$_6$Cl$_5$)—.

Signed and sealed this 7th day of April 1959.

[SEAL]

Attest:
KARL H. AXLINE,
*Attesting Officer.*

ROBERT C. WATSON,
*Commissioner of Patents.*